Jan. 3, 1933.  S. C. PHILIPS  1,893,303

SAFETY EXTENSION SIGNAL

Filed Oct. 6, 1930

INVENTOR
Samuel C. Philips
BY Arthur C. Brown
ATTORNEY

Patented Jan. 3, 1933

1,893,303

UNITED STATES PATENT OFFICE

SAMUEL C. PHILIPS, OF TULSA, OKLAHOMA

SAFETY EXTENSION SIGNAL

Application filed October 6, 1930. Serial No. 486,667.

My invention relates to safety devices and more particularly to signals for use on trailers commonly attached to the rear ends of trucks for hauling long timbers, pipes and the like; the principal object of my invention being to provide apparatus for preventing accidents resulting from vehicles driven into projecting load ends of truck and trailers due to lack of, or inadequate warning signals on loads of that character.

A further object of the invention is to provide warning apparatus that is equally well adapted for day or night driving and that may be readily attached at any clearly visible point on the load or vehicle.

In accomplishing these and other objects of my invention I have provided improved details of structure the preferred forms of which are illustrated in the accompanying drawing, wherein.

Figure 1:
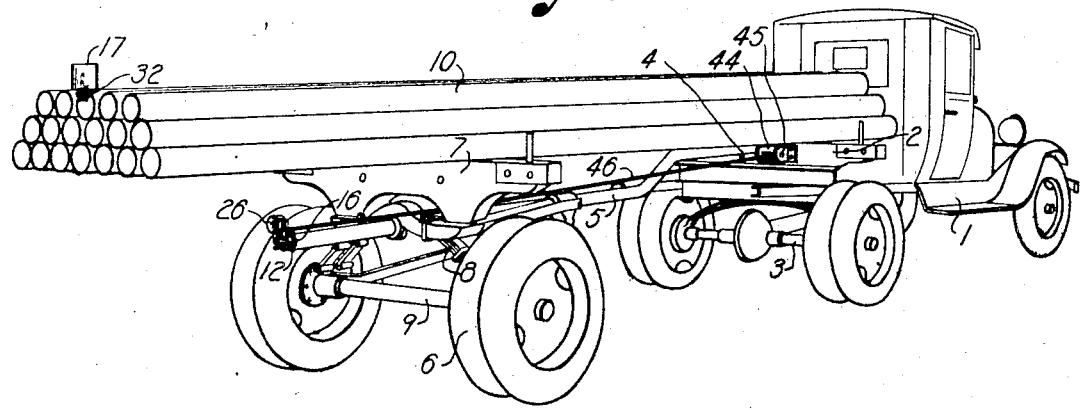
Fig. 1 is a perspective view of a loaded truck and trailer, an interchangeable signal light and flag being mounted respectively on the trailer pole and rear end of the load.
Figure 2:
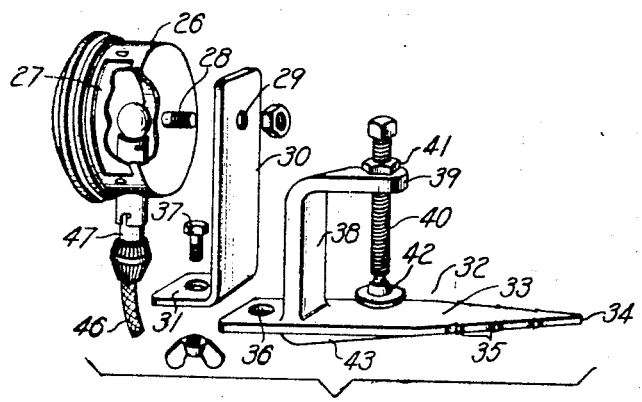
Fig. 2 is a perspective view of a supporting clamp, and of a signal light and mounting bracket shown in disassembled relation therewith.
Figure 3:
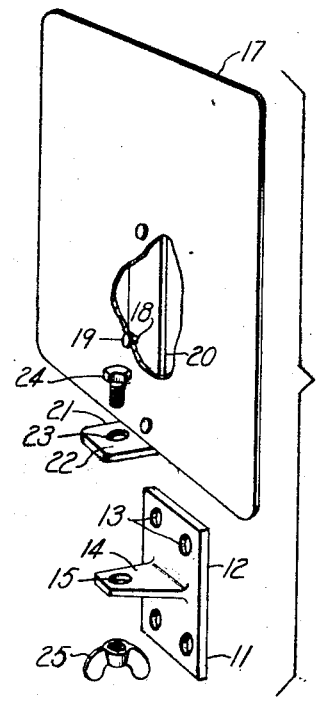
Fig. 3 is a perspective view of a supporting bracket, and of a signal flag in disconnected relation therewith, a portion of the flag being broken away to disclose its mounting bracket.

Referring more in detail to the drawing:

1 designates a truck including a bolster 2 mounted above the rear axle 3 of the truck and provided with a bracket 4 attached to the rear face of the bolster for receiving the front end of a trailer pole 5 connected to a trailer truck 6. A bolster 7 of the trailer truck, cooperating with the bolster 2, is mounted by springs 8 on an axle 9 of the trailer, thus providing a rear support for loads of long pipes 10 or the like conveyed by the truck and trailer.

In order to properly comply with State laws requiring warning signals on the rear ends of loads or vehicles, I have provided signal apparatus as now described.

A supporting bracket 11, for mounting on the rear end of a trailer, includes a face plate 12 having openings 13 and an integral seat portion 14 extends laterally from the plate and is provided with an opening 15. When mounting the supporting bracket on a wooden trailer pole bolts or the like may be extended through the openings 13 for securing the bracket to the pole. However, when the trailer pole is constructed of metal, as shown in Fig. 1, the face plate of the bracket may be welded to the rear end of the pole, as indicated at 16.

Suitable signals for either day or night driving may be secured on the supporting bracket, one preferred form of a day signal comprising a flag 17, rectangular in shape, and having openings 18 through which rivets 19 or the like may be extended for securing the flag to an upwardly extending bar 20 of a mounting bracket 21 terminating at its lower end in a horizontal base portion 22 adapted for seating on the portion 14 of the supporting bracket.

An opening 23 provided in the base portion aligns with the opening 15 of the supporting bracket when the mounting bracket is seated thereon, and a bolt 24 extended through the aligning openings is provided with a wing nut 25 for readily attaching or detaching the flag from the supporting bracket.

When mounted on the supporting bracket the bar 20 engages the face plate of the bracket, thereby preventing rotation of the flag and necessitating the use of only a single bolt for assembling the parts.

For night driving a tail light 26 of ordinary construction is used with the exception that side windows 27 of red transparent material are provided on opposite sides of the lamp body, and a bolt 28, formed in the rear end thereof, is extended through a complementary opening 29 in a mounting bracket 30 having a base portion 31 identical to the portion 22 of the bracket 21, so that either of these brackets may be mounted on the supporting bracket 11.

In order to attach either the flag or the signal light to loads of various characters, I have provided a supporting clamp 32, including a seat portion 33 terminating at one end in a point 34 formed with barbs 35, for readily securing the clamp to a wooden load by driving the point into the wood. The opposite end of the base portion is provided with an opening 36 for receiving the bolt 37, and a laterally extending back and hook member 38 terminates in a finger 39, spaced from and parallel to the seat portion.

A clamp screw 40, provided with a lock nut 41, is threaded in the outer end of the parallel finger 39 adjacent its outer end and is provided on its lower end with a pivoting bearing plate 42. Rigidity of the clamp is increased by a rib 43 formed on the lower face of the seat portion 33.

In order to supply current to the lamp when mounted either on the end of the trailer truck or on a load carried by the vehicle, a reel 44 is connected by a bracket 45 to the bolster or other convenient part of the truck, and a flexible lamp cord 46 normally wound on the reel by spring mechanism, as is commonly employed for this purpose, is led to the lamp and attached thereto by a socket member 47 as in ordinary practice.

Assuming an apparatus to be constructed as described the method of mounting the apparatus on a trailer truck for day or night driving would be as follows:

When hauling loads the supporting clamp is attached to the extreme rear end of the load, as shown in Fig. 1. It will be readily apparent that when hauling pipe and similar material the clamping screw 40 is used for securing the supporting clamp to the pipe. If the load consists of long timbers or the like the point of the supporting clamp is driven sufficiently deep into the wood to prevent any possibility of the clamp dislodging therefrom.

If trips are made during the day the flag is attached to the supporting clamp and the lamp is securely mounted on the supporting bracket. For hauling loads after dark the position of the flag and lamp is reversed. In this manner a conspicuous warning signal is provided on the loaded vehicle at all times.

When driving without a load, either of the signals may be mounted on the supporting bracket secured to the rear end of the trailer pole, and the other signal may be carried in the truck or at some other convenient point on the vehicle.

Figure 4:
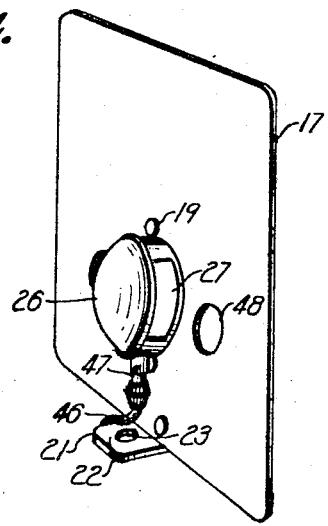
Fig. 4 is a modified form of a signal light and flag constructed as a single unit.

In the modified form shown in Fig. 4 a single unit embodying both the light and the flag is shown, the mounting bracket in this structure being provided with openings for receiving rivets to attach the signal to the bracket and also with an opening for receiving the bolt 28 of the lamp.

Openings 48 are further provided in the signal on opposite sides of the lamp so that light reflected through the side windows of the lamp will be visible through said openings. It will be readily apparent that the combined unit may be also mounted on either a supporting bracket or on a supporting clamp.

What I claim and desire to secure by Letters Patent is:

1. In apparatus of the character described, a supporting bracket having a tapered point at one end and a seat portion at its opposite end, a laterally extending back member on the bracket intermediate its ends, a mounting bracket having a bar portion and a base portion for resting respectively on said back and seat portions, and means for securing the mounting bracket to said supporting bracket.

2. In apparatus of the character described, a supporting bracket having a tapered point at one end and a seat portion at its opposite end, a laterally extending back member on the bracket intermediate its ends terminating in a finger spaced from and parallel to the tapered point, a clamp screw threaded through said finger, a mounting bracket having a bar portion and a base portion for resting respectively on said back and seat portions, and means for securing the mounting bracket to said supporting bracket.

3. In apparatus of the character described, a supporting bracket having one end tapered and an opposite end forming a seat portion, an upstanding back member on the bracket intermediate its end terminating in a lateral finger spaced from and substantially parallel to the tapered point, a clamp screw threaded through said finger for clamping engagement with the bracket, a mounting bracket having a bar portion and a base portion for resting respectively on said back and seat portions, and a bolt extended through said base and seat portions for detachably securing the mounting bracket to the supporting bracket.

In testimony whereof I affix my signature.

SAMUEL C. PHILIPS.